Dec. 13, 1955 G. DOWNING 2,726,615
WELDING APPARATUS
Filed Nov. 16, 1951 4 Sheets-Sheet 1
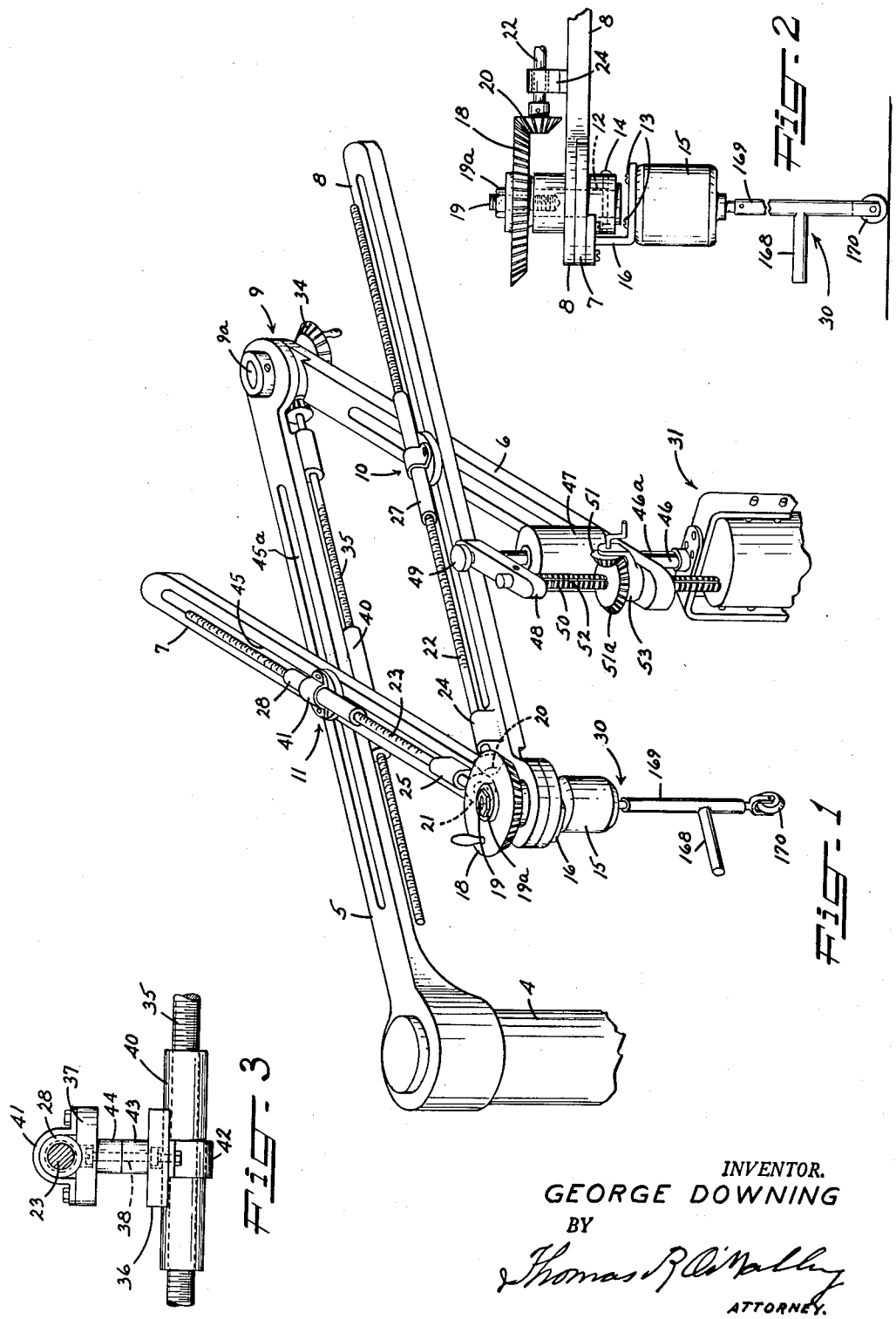
INVENTOR.
GEORGE DOWNING
BY
Thomas R. O'Malley
ATTORNEY.

Dec. 13, 1955  G. DOWNING  2,726,615
WELDING APPARATUS
Filed Nov. 16, 1951  4 Sheets-Sheet 2

INVENTOR.
GEORGE DOWNING
BY
Thomas R. O'Malley
ATTORNEY.

Dec. 13, 1955   G. DOWNING   2,726,615
WELDING APPARATUS

Filed Nov. 16, 1951   4 Sheets-Sheet 3

INVENTOR.
GEORGE DOWNING
BY
Thomas B. O'Malley
ATTORNEY.

Dec. 13, 1955     G. DOWNING     2,726,615

WELDING APPARATUS

Filed Nov. 16, 1951     4 Sheets-Sheet 4

INVENTOR.
GEORGE DOWNING
BY
Thomas R. O'Nally
ATTORNEY.

United States Patent Office  2,726,615
Patented Dec. 13, 1955

2,726,615
WELDING APPARATUS

George Downing, Parkersburg, W. Va., assignor to American Viscose Corporation, Philadelphia, Pa., a corporation of Delaware Application November 16, 1951, Serial No. 256,656

6 Claims. (Cl. 113—59)

This invention relates to metal working equipment and particularly to a pantographic scriber for applying a fusible material to a devious work path in response to indications from a tracing mechanism. Although suitable for applying a number of fusible materials having relatively low melting temperatures, such as organic thermoplastic resins, the apparatus of the invention is particularly adapted for use in forming weld joints or fillets of lead and is hereinafter described with reference to lead as the fusible material to be applied by the apparatus.

It is an object of the invention to provide an apparatus which is at least partly automatic for welding materials which have melting point temperatures such that a quantity of such material may be readily maintained in the molten state ready for application to the work. It is another object to provide a welding machine of a type having separate devices for heating the work and for feeding a fusible material thereto wherein the orientation of the devices is automatically changed to maintain a desired alignment with the direction of a work path. It is also an object to provide a machine having separate work-heating and material-feeding devices in which the direction of progress of the devices may be controlled to cause the devices to follow a predetermined devious weld path. A further object is to utilize a fusible material in scrap form in the operation of a welding machine to thus eliminate the cost entailed in providing such material in a preformed or precut condition. Other objects, features and advantages will become apparent from the following description of the invention and the drawing relating thereto in which:

Fig. 1 is a pictorial view of one embodiment of the invention;

Fig. 2 is a fragmentary elevation of a portion of the apparatus shown in Fig. 1;

Fig. 3 is an enlarged elevation of one of the swivel joints which constitute portions of the apparatus of Fig. 1;

Figure 8:
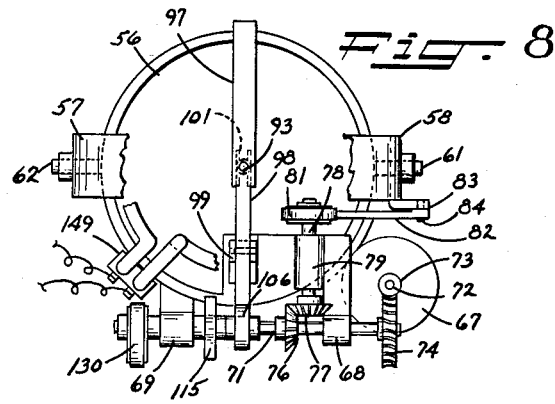
Fig. 8 is a top view of the welding unit.

In brief, apparatus in accordance with the present invention comprises a movable welding unit having separate devices for heating the work and for feeding the fusible material in molten condition to the work, a support system for the unit providing three dimensional movement of the unit with respect to a work plane, a tracing device for following outlines as provided by pictorial matter, templates or models, an electrical and mechanical system for turning the welding unit which is responsive to the movements and direction of alignment of the tracing device, and a drive system for producing intermittent movements of the unit lengthwise of a work path, vertical reciprocating movements of the heating device within the unit, and sidewise reciprocable movements of the heating device and the feeding device within the unit. The feeding device includes also a container provided with a heater for the purpose of melting scraps of fusible material and maintaining a quantity of molten material in readiness for application to the work.

Fig. 1 illustrates a pantograph type apparatus having a main support post 4 and link members 5, 6, 7 and 8. The link members 5 and 6 are joined together in a hinged joint 9 constructed about a pin 9a. The portions of the link members 5 and 6 adjacent the hinge joint are contoured so as to permit the upper flat surfaces of the members 5 and 6 to extend substantially within a common plane. The link members 7 and 8 are supported on the members 5 and 6, and the members 7 and 8 have lower flat surfaces extending within a common plane which slidably engage the upper surfaces of members 5 and 6. The pivotal connection of members 7 and 8 to members 5 and 6, respectively, is accomplished by swivel joints 10 and 11 of similar construction (joint 11 being illustrated in Fig. 3). The members 7 and 8 are connected in hinged relationship about a pin 12 as shown in Fig. 2. The pin 12 is secured nonrotatably within the hub portion of the link member 7 by a smaller pin or rivet 14. The motor 15 is supported below, and in coaxial relationship with, the pin 12 by a bracket 16 bolted to the lower surface of the link member 7.

A bevel gear 18 is secured in rotatable and coaxial relationship with the upper end of the pin 12 by means such as a stud 19 and a nut 19a. The bevel gear meshes with two smaller gears 20 and 21 fixed to the end of traverse screws 22 and 23 respectively. The screws extend through bearings 24 and 25 which hold the screws from moving lengthwise as well as transversely to their length. The traverse screws extend in threaded relationship through threaded portions 27 and 28 respectively of the swivel joints 10 and 11. By rotating the bevel gear 18, the screws 22 and 23 are rotated and the joints 10 and 11 are traversed lengthwise of the link members 7 and 8.

To obtain transmission of movements between a tracing unit 30 and a welding unit 31 which are accurately parallel, it is necessary that the pantograph system of the apparatus be adjusted to an accurately formed parallelogram described by the portions of the members 7 and 8 extending from their point of connection at the pin 12 to the swivel joints 10 and 11, and the portions of the members 5 and 6 which extend from the swivel joints to their point of connection about the axis of the pin 9a. Accordingly, an adjustment of the joints relative to members 7 and 8 by rotation of the bevel gear 18 requires a corresponding adjustment of the swivel joints lengthwise of the members 5 and 6.

The latter adjustment is effected by rotation of a bevel gear 34 which engages a pair of bevel gears fixed to the ends of traverse screws extending underneath members 5 and 6. This latter pair of screws, of which only screw 35 supported beneath member 5 is visible in Fig. 1, are similar in construction and mounting to screws 22 and 23 of member 7 and 8. The swivel joints 10 and 11 are illustrated in detail by a showing of the joint 11 in Fig. 3. The joint comprises a pair of base members 36 and 37 which are held together by a pin or bolt 38. An arcuate groove extends across the face of the flange portion of each of these base members and is complementary to the exterior peripheral surface of the threaded tubular elements 28 and 40. Clips 41 and 42 are forced tightly against the elements 28 and 40 by bolts extending into the flanged portions of the base members 36 and 37. The sleeves 43 and 44 attached to the base members have lengths corresponding to the depth of slots 45 aand 45a in members 7 and 5 respectively. The outside diameters of sleeves 53 and 44 correspond to the width of the slots.

As shown in Fig. 2, a tracing unit 30 extends downwardly coaxialy with the axis of the joint for the members 7 and 8. To complete the pantograph arrangement of the embodiment shown in Fig. 1, the welding unit 31 is mounted rotatably near the end of the member 6 for rotation with respect to the member 6 on an axis parallel to that of the unit 30. The unit 31 is suspended on a shaft 46 which extends through the member 6, a motor 47, and an adjustable support arm 48. A suitable thrust bearing is provided by the upper surface of the arm 48 for an enlarged end-portion 49 of the shaft 46 for supporting the weight of the unit 31. Since the rotation of the unit 31 seldom exceeds angular changes of small magnitude, a very simple bearing may be provided such as the enlarged end-portion or cap 49 resting on the upper surface of the arm 48 which surrounds an aperture therethrough for shaft 46. Such a bearing is entirely satisfactory if kept lubricated. Moreover, in ordinary operation, a thrust bearing is not necessary since the weight of the unit 31 is preferably supported by the work with the arm 48 adjusted to some distance below the cap 49.

The arm 48 is adjustable in a direction parallel to the axis of the shaft 46 to raise and lower the unit 31 by a suitable guide and traversing mechanism such as that shown comprising screw 50 non-rotatably secured to the arm 48 and manually operable bevel gears 51 and 51a, the latter of which has an internally threaded hub engaging screw 50. The surface of a keyway 52 extending lengthwise of the screw 50 engages a key fixed within the bearing section 53 of the link 6 to overcome any tendency of the arm 48 to rotate with respect to the axis of the screw. The shaft 46 extends through a hollow armature shaft of the motor 47. Suitable complementary key or spline construction is provided on the exterior surface of the shaft 46 and the interior of the armature shaft to permit slidable but nonrotatable relationship between these shafts for substantially the length of the shaft 46. In Fig. 1, the shaft 46 is provided with a key 46a which protrudes from the cylindrical surface of the shaft and engages a complementary keyway of the hollow armature shaft (not shown) of the motor 47.

Figure 4:
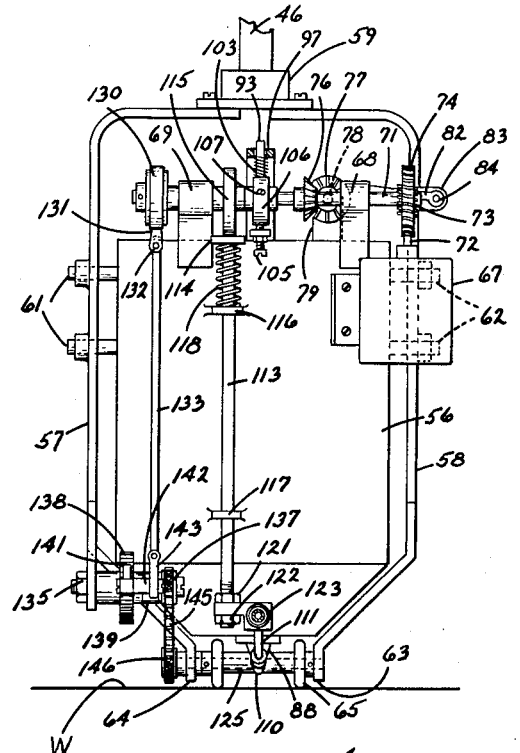
Fig. 4 is a view of a welding unit which is used with the apparatus illustrated in Fig. 1.
Figure 7:
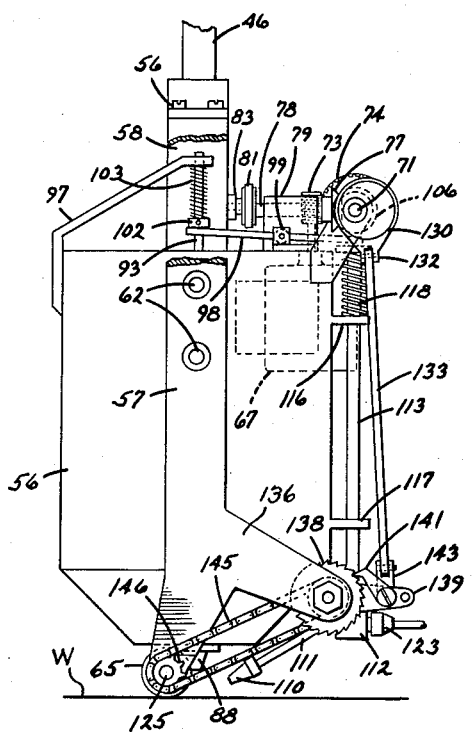
Fig. 7 is a side view of the welding unit shown in Fig. 4 with a portion thereof broken away.

The welding unit 31 is shown in greater detail in Figs. 4, 7 and 8. The unit comprises, as essential support members thereof, a tank or receptacle 56, the frame members 57 and 58, and a bracket 59 to which the members 57 and 58 and the shaft 46 are secured. The frame members have apertured bearing portions to receive pairs of trunnions 61 and 62 which extend from opposite surfaces of the receptacle 56 in which the receptacle is horizontally reciprocable. The members 57 and 58 terminate at the lower end of the unit in bearing portions 64 and 63, respectively, through which extends the axle or shaft of a traction rotor or roller 65. The rotor is adapted to engage a work surface W and to space the remainder of the unit with respect to the work surface. When driven, the rotor 65 propels the unit 31 relative to the work surface in any desired direction as determined by suitable orientation of the unit with respect to the axis of the shaft 46.

The walls of the receptacle 56 may be utilized as structure for supporting various items of the unit in rigid connection therewith, and as shown, a motor 67 is secured to the side of the receptacle with the axis of rotation of the motor generally parallel to the axis of the shaft 46. Also supported on the receptacle 56 by bearings 68 and 69 attached thereto, is a shaft 71 extending transversely with respect to the motor shaft 72 and connected therewith by a worm gear 73 and a worm wheel 74 having a desired drive reduction ratio. A satisfactory ratio is such as to produce rotation of the shaft 71 at approximately 60 revolutions per minute. In utilizing motors of standard design which have rotative speeds of 1750 to 1800 revolutions per minute, a 30 to 1 reduction ratio has been found satisfactory in the practice of the present invention.

Four separate control movements of the welding unit 31 are derived from the shaft 71. First considered of the respective driving connections for obtaining those movements, in the order in which they occur in Fig. 4 in a direction toward the left from the gear 74, is the mechanism for producing horizontal reciprocable movement of the receptacle and apparatus mounted thereon relative to the frame members. A mechanism such as the one shown may be arranged as follows: a bevel gear 76, secured on the shaft 71, engages a bevel gear 77 of like periphery mounted on a shaft 78. A bearing 79 attached to, and supported on, the receptacle wall supports the shaft 78 transversely with respect to the shaft 71. Mounted on the shaft 78 is an eccentric drive 81 attached by a connecting rod 82 to a lever 83 of the frame member 58. The rod 82 is pivotably conected to the extension 83 by a pin 84. A satisfactory range of movement for the receptacle relative to the supporting frame therefor is approximately ½ inch; thus the eccentricity will be one-quarter of an inch.

Figure 5:
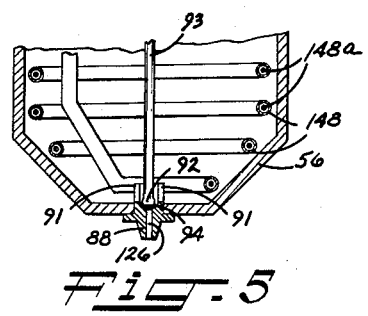
Fig. 5 is a fragmentary sectional view of the lower portion of the welding unit.

The motion of the unit next considered is the operation of a valve for intermittently discharging small amounts of molten fusible material held by the receptacle. A valve seat fixture 88 is attached centrally to, and extends through, as shown in Fig. 5, the bottom wall or floor of the receptacle.

As shown, the fixture 88 has an upper portion comprising arcuately-shaped annularly-arranged segmental sections 91 separated by slots. The inner surfaces of the sections 91 are complementary to the circumference of the rounded end-portion 92 of a valve rod 93 and guide the rod portion 92 in movements toward and away from a seating surface 94. The valve rod 93 extends upwardly above the cylindrical walls of the receptacle and through an upwardly-projecting guide-arm 97 of the receptacle. To raise the valve rod from the seat 94, I provide a lever 98 pivotably supported by pin-and-clevis structure 99 attached to the receptacle wall. The valve rod 93 extends through a slot 101 in the end of the lever 98. A detent, such as a collar 102 secured to the valve rod, is engaged by the lever 98; the collar also engages a compression spring 103 which thrusts the valve rod 93 against the valve seat 94 except when the rod is raised by the lever 98. An adjusting screw 105 (Fig. 4) extends through the right end of the lever 98, as viewed in Fig. 7, into engagement with a cam 106 secured on the shaft 71. Rotation of the cam 106 thus results in opening and closing of the valve. The degree to which the valve is opened and the period during whihc the valve is open may be changed by adjusting the screw 105. The cam 106 may be adjustably secured to the shaft 71 by means of a set screw 107 to obtain any desired setting of the cam periphery with respect to the axis of the shaft, to time the opening of the valve with respect to the other movements of the unit 31.

A third motion obtained in the operation of the unit 31 is vertical reciprocal movement of the burner assembly. This assembly comprises a burner nozzle 110, a tube 111 for supporting the nozzle, a block 112 for holding the tube, and a push-rod 113 having its lower end-portion attached to the block. The rod 113 extends upwardly from the block and terminates in a head 114 which engages a cam 115. Guides 116 and 117 secured to the receptacle wall slidably hold the push-rod in alignment for vertical movement. The push-rod is urged toward the cam 115 by a compression spring 118 held between the guide 116 and the head 114. The burner nozzle 110 may be adjusted with respect to the work surface W in a direction normal thereto by turning the nuts 121 and 122 with respect to the lower threaded portion of the push rod. Adjustment of the burner nozzle parallel to the work surface is made by loosening the lead-grip of a chuck 123 mounted on the block 112 coaxially with a bore thereof through which the tube 111 extends. About one half of the periphery of the cam 115 is concentric with the turning axis of the cam; the remainder of the periphery breaks sharply with the concentric portion to a middle portion of minimum radius. In operation, the cam holds the burner close to the work for one half revolution of the shaft 71; during the other half revolution, the burner reciprocates away from, and then toward, the work surface.

Propulsion of the unit 31 relative to a work surface is the fourth and last considered motion to be derived from the drive motor 67 of the unit. In operation, the unit is supported on the work surface W by the traction rotor 65 which is journaled as hereinbefore described in portions of the frame. The axis of rotation of the rotor is preferably normal to the axis of the vertical support shaft 46, i. e., the turning axis of the unit, to facilitate the guiding of the unit. The position and inclination of the burner nozzle 110 is such that the area of the work heated is slightly to the rear of the rotor shaft 125. The drainage aperture 126 of the valve is disposed immediately over the region heated just out of vertical alignment with any of the periphery of the rotor section 125 so that the molten material discharged from the aperture does not drop upon the surface of the rotor. The middle section of the rotor 65 is preferably small so that the aperture may be disposed closely to the turning axis of the unit. With such an arrangement, sharp curves or corners of a welding path may be negotiated without appreciable deviation of the aperture 126 from a position over the weld path.

To obtain intermittent rotation of the rotor 65, an eccentric drive 130 is mounted on the shaft 71. The eccentric strap member 131 of the drive is connected pivotally at 132 to a connecting rod 133. Disposed immediately below the eccentric drive is a shaft 135 extending lengthwise in a direction parallel to that of the shaft 71 and supported on an arm 136 of the frame member 57. Supported rotatably on the shaft 135 is a sprocket 137 and a ratchet-wheel 138 which are keyed together. A pawl holder 139 is also rotatably supported on the shaft but is rotatably independent of the ratchet wheel and the sprocket except for engagement of the pawl 141 with ratchet wheel periphery. The driving arm 142 of the pawl holder is connected pivotally to the connecting rod 133 through an intermediate link 143. Such an arrangement permits the connecting rod to swing as the result of relative reciprocal movement between the receptacle 56 (on which the shaft 71 is rotatably supported) and the frame member 57 (on which the ratchet-drive and sprocket system for driving the rotor 65 is mounted). The sprocket 137 is connected by a chain 145 to a sprocket 146 secured to an axial extension of the rotor 65.

Figure 13:
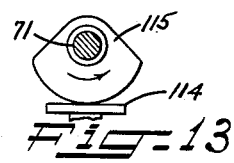

The cams used to initiate the four types of movements performed by various portions of the unit 31 just described may be secured relative to each other on shafts 71 and 78 to obtain any desired cyclical operation. Figs. 12 to 15 illustrate a preferred setting of such cams and eccentric discs in the positions in which they occur at one instant during operation of the unit. For example, when the unit is midway of a movement of advancement relative to the work surface (i. e., toward the left in Fig. 7) the disc of the eccentric 130 is midway through the ratchet-engaging stroke of the pawl 141. At this same instant, a point midway along the concentric portion of the periphery of cam 115 engages the head 114 as shown in Fig. 13.

Figure 14:
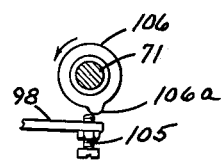
Figure 15:
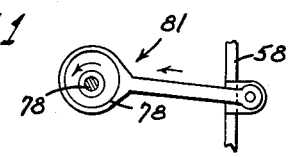

Simultaneously, the lobe 106a of the cam 106 is engaging the screw 105, as shown in Fig. 14, to open the valve in the bottom of the receptacle 56. At this instant, the eccentric drive 81 and the shaft 78 have rotated to a position such as shown in Fig. 15 wherein the receptacle is held midway along its travel between the frame members 57 and 58.

When the apparatus of the invention is used for "lead-burning," pieces of lead may be charged periodically into the receptacle. Impurities that may occur in the scrap promptly rise to the top of the molten bath as the lead melts.

Figure 6:
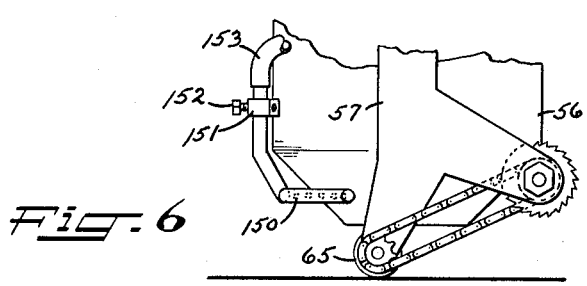
Fig. 6 is a fragmentary view on an enlarged scale of the lower portion of the welding unit illustrating modified heating apparatus.

Such pieces may consist of scrap lead reclaimed from any source whatsoever and reduced to pieces having size sufficiently small to be dropped into the top of the receptacle through the opening provided between the top edge of the receptacle and the valve rod 93. The lead is melted by a heater, such as the coil 148 comprising copper tube encased resistance wire 148a shown in Fig. 5. The end-portions of the coil extend upwardly and over the edge of the receptacle into a terminal block 149. The coil 148 is of standard construction similar to that of electric kitchen stoves. While an electrical heater is a preferred means for heating the lead held within the receptacle, a gas flame may be applied to the exterior surface thereof when the receptacle is fabricated from a heat conductive material such as steel. Fig. 6 illustrates a burner 150 supported adjacent the lower frusto-conical surface of the receptacle 56. A clamp 151 having a set screw 152 holds the burner in place and is attached to the receptacle by means such as a weld joint. The burner is connected by a tube 153 (preferably flexible) with a supply source such as required to supply a combustible gas to the work-heating burner 110. The burner 150 may be used in place of, or in conjunction with, the electrical heater 148 hereinbefore described.

It is necessary that the unit 31 be maintained during operation in a desired alignment with respect to the weld path. Since the burner is aimed toward the work surface, preferably at an angle of approximately 45° with the surface, the valve fitting 88 is disposed ahead of, and above, the burner nozzle 110 over the surface being heated. The unit as a whole moves preferably in such a direction as to deposit the molten lead or other fusible material on heated portions of the weld path; such heating occurring as the result of the hot gases deflected ahead in the direction of advancement from the area of initial contact with the work.

Figure 10:
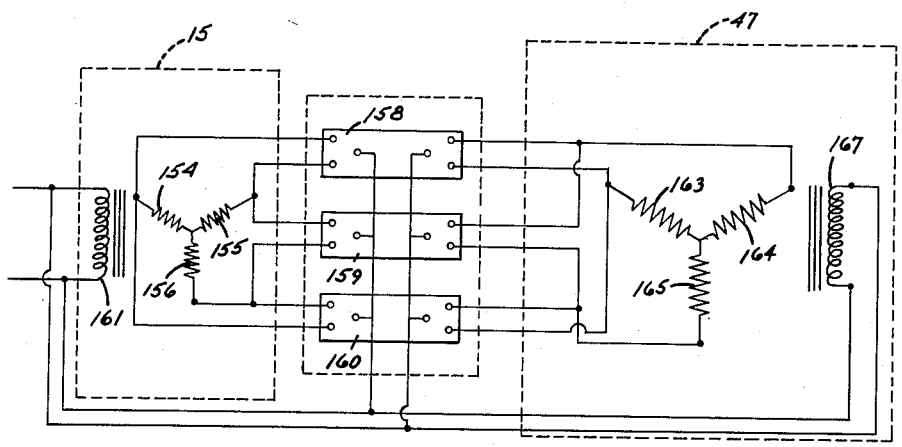
Fig. 10 is a circuit diagram of an electrical control system used in the apparatus of Fig. 1.

To obtain travel of the unit 31 along a desired weld path, a servo-motor system may be provided to bring about angular changes of alignment of the unit with respect to an axis normal to the work surface in response to like changes in the direction of aim of a tracing unit. In the embodiment of the invention illustrated by Fig. 1, self-synchronizing motors 15 and 47 of the well-known type exemplified by those manufactured under the trademark "Selsyn" by the General Electric Company are utilized to maintain agreement in the alignment of the welding unit and the tracing unit. In the servo-system herein described, the motor 47 is preferably larger than the motor 15 (the latter motor usually referred to in servo-motor systems as a "generator") to overcome torque resistance encountered in guiding the unit 31. The system for electrically connecting the motors herein described has the advantage of preventing the transmission of torque encountered by the motor 47, back to the motor (or "generator") 15. Such a connective system is illustrated in Fig. 10 wherein the portion of the diagram enclosed within the dotted-line rectangle at the left represents the generator 15 of the tracing unit 30 and the portion within the dotted-line rectangle at the right represents the motor 47 which turns the welding unit 31. In the generator 15, Y-connected stator windings 154, 155 and 156 are connected as shown to the input terminals of three electronic amplifiers 158, 159 and 160. The Y-connected stator windings 163, 164 and 165 of the motor 47 are connected as shown to output terminals of the amplifiers. A change of position of the rotor winding 161 results in changes in the current relationship within stator windings of the generator 15. The new balance of current values in the stator windings resulting from such a rotary movement of the rotor of generator 15 is reproduced electronically in amplified form within the stator windings of the motor 47. The rotor thereof having a winding 167 then responds with a change of position similar to that performed by the rotor of generator 15. Since the current changes are reproduced electronically, there is no reflected torque to be encountered in operating the manually controlled tracing unit 30.

Operation of the apparatus shown in Fig. 1, assuming the burner to be discharging a flame and a supply of fusible material in molten condition within the container 56, merely amounts to gripping the handle 168 of the tracing unit to apply a torque force to the spindle 169 of the unit as a roller 170 thereof follows a path indicated on a blueprint, tracing, or other pictorial matter. The tracing unit is propelled by the movement of the self-propelled welding unit transmitted through pantograph system already described; it is merely necessary to steer the tracing unit. Traction between the unit 31 and the work is obtained by adjusting the arm 48 downwardly below contact with the cap 49 of the shaft 46.

Figure 9:
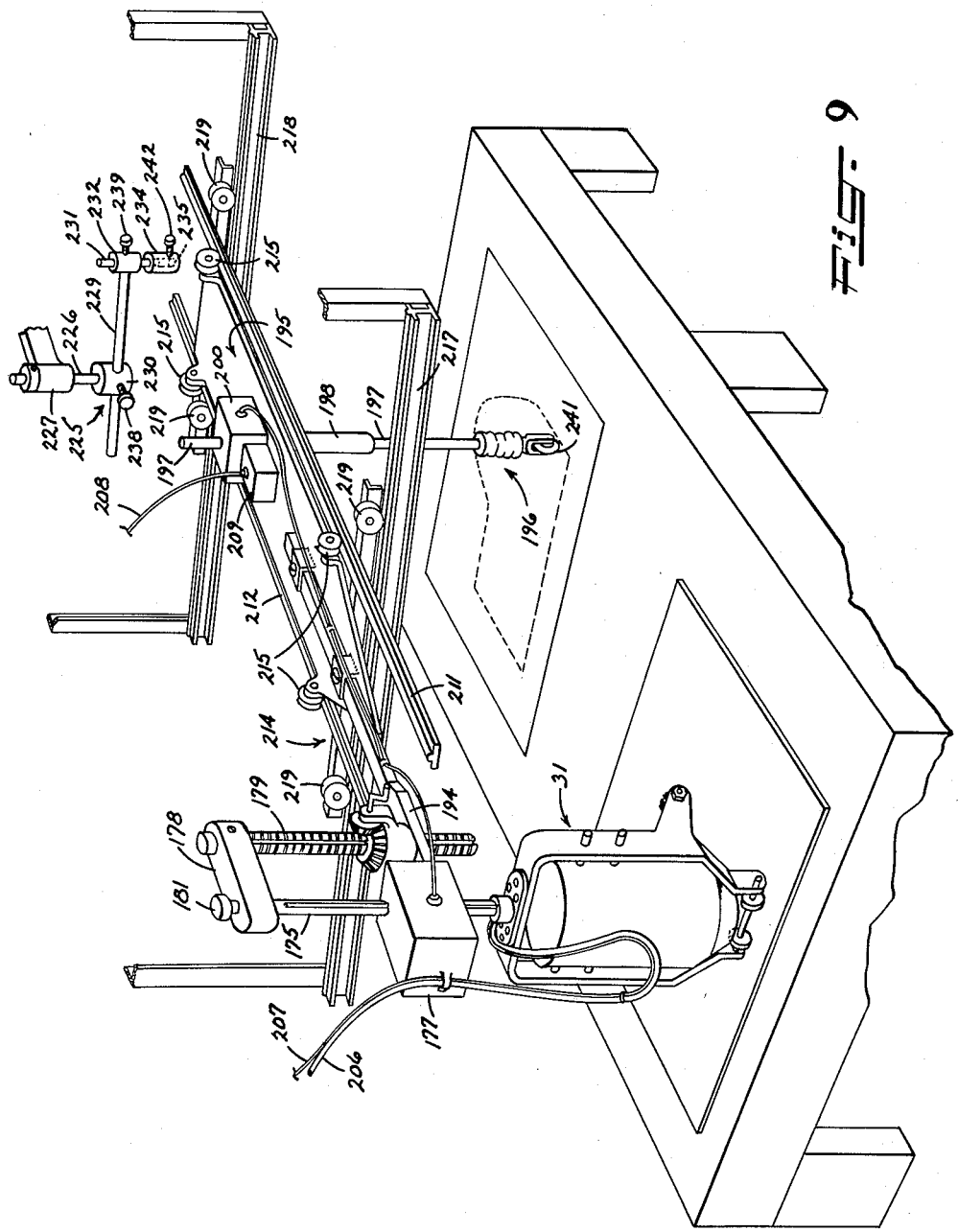
Fig. 9 is a pictorial view of a modified welding machine.

Fig. 9 illustrates pictorially a modified form of welding or lead-burning apparatus of which the directional orientation of the welding unit is obtained by an electrical Wheatstone bridge system responsive to changes in the orientation of a tracing member. The welding unit 31 hereinbefore described is mounted on a shaft 175 extending slidably in splined relationship through a cog 176 shown diagrammatically in Fig. 11 and supported between suitable thrust bearings within a housing 177. The shaft 175 extends also through an elevating arm 178 which is raised and lowered by the screw 179 to obtain vertical adjustment of the unit. When the unit 31 is not in contact with a work surface, it is supported by a thrust bearing such as formed by a cap 181 attached to the shaft 175 in engagement with the upper surface of the arm 178.

Figure 11:
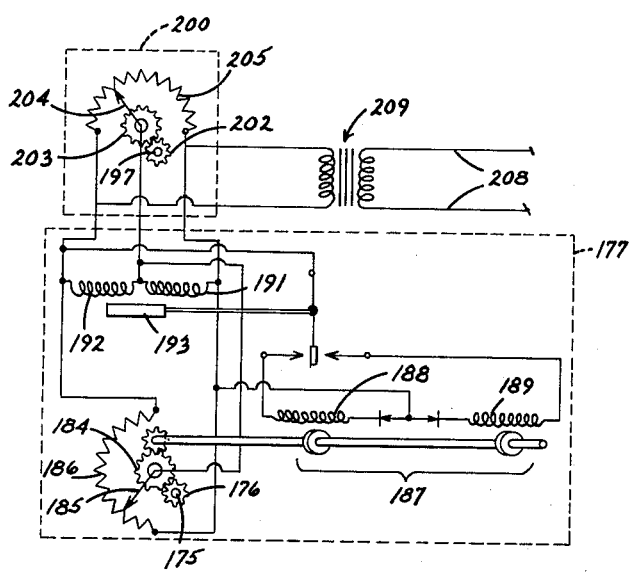
Fig. 11 is a circuit diagram in an electrical control system used in the apparatus of Fig. 1.
Figure 12:
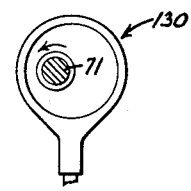
Figs. 12 through 15 illustrate motion-producing mechanisms of the welding unit in the respective positions thereof at a selected instant of operation.

The housing 177 contains apparatus enclosed within the dotted-line rectangle of Fig. 11 bearing the same numeral. The cog 176 engages a larger cog 184 which swings the contact arm 185 along a rheostat coil 186. The cog 184 is geared also to the armature shaft of a reversible shaded-pole type control motor 187 with windings 188 and 189. A double-acting relay having coils 191 and 192 is positioned in the circuit to detect any unbalanced current and to operate as the result of movement of a magnetically-sensitive member 193 to control the motor when such unbalance exists. The housing 177 is mounted on an arm 194 of carriage 195. This carriage also supports a tracing unit 196 having a spindle 197 which extends upwardly through a bearing 198 of the carriage and through a housing 200. Within the housing 200 the spindle 197 extends through a cog 202 of Fig. 11 secured to the spindle for rotation therewith. The cog 202 meshes with a larger cog 203 which swings a contact arm 204 secured thereto along a rheostat coil 205. Assuming a current balance in the system, a change of position of the arm 204 causes a current unbalance which energizes one coil or the other of the relay. The corresponding winding 188 or 189 of the control motor 187 is energized and the arm 185 is driven to a position relative to the coil 186 wherein current equilibrium is again established in the relay coils 191 and 192. The cogs 176 and 202 are preferably smaller than the cogs 184 and 203 so that the range of each of the rheostat coils 186 and 205 corresponds to a range of rotation of both the tracing unit 196 and the welding unit 31 that is substantially greater than 360°. For example, if the rheostat coils are semi-circular, a ratio of 4 to 1 between the diameter of the larger and the smaller cogs will permit 720° of rotation of the units. On rare occasions, the limit of turning as defined by an extremity of the rheostat coil will be reached. All that is necessary at this time is to turn the tracing unit 360° backward from the limit reached. Such an arrangement is advantageous from the standpoint that the slack provided in the fuel and power lines comprising a flexible tube 206 and a wire cord 207 leading to the unit 31 never is completely exhausted with limits placed on the range of rotation of the welding and tracing units. The electrical power for the control circuit illustrated in Fig. 11 is supplied through alternating current supply lines 208 and through a transformer 209.

The movement of the unit 31 to any point within the plane of its working area while being supported along a vertical turning axis is obtained by a conventional arrangement, i. e., the carriage 195 being freely movable along the rails 211 and 212 of a carriage 214 on rollers 215. Carriage 214 moves along stationary rails 217 and 218 on its rollers 219.

When operating the machine illustrated in Fig. 9 with respect to a devious non-circular weld path, an operator is required for manipulating the tracing member 241 of unit 196. However, when welding along circular paths, the guiding of the unit 31 is made completely automatic by operation of a device 225 supported centrally over the region in which the carriage 195 is movable. The device 225 comprises a spindle 226 rotatably supported by a stationary bearing 227 on an axis parallel to the axis of the spindle 197 and the shaft 175, an arm 229 that is adjustable with respect to the hub 230 of the spindle 226, a shaft 231 that is adjustable in a direction parallel to the axis of the spindle 226 within the hub-portion 232 of the arm 229, and an adapter 234 having a bore 235 parallel to the axis of the spindle 226. The adapter 234 is fixed to the shaft 231. The bore 235 is complementary to the upper end-portion of the tracing unit spindle 197.

To prepare the apparatus of Fig. 9 for welding in a circular path, the arm 229 is adjusted relative to the hub 230 so that the distance between the axis of the bore 235 and the spindle 226 is the same as the radius of the weld path. A set-screw 238 may be used to maintain the desired adjustment. The shaft 231 is then made slidable with respect to the hub 232 such as by loosening a set screw 239, and the adapter is then placed over the upper end-portion of the spindle 197. The wheel 241 is aligned in a direction that is tangential with respect to the radius described by the arm 229 about the spindle 226. A set-screw 242 is tightened against the spindle 197. The set-screw 239 is also tightened against the shaft 231 so that the shaft and the adapter hold the spindle 197 with the wheel 241 maintained in tangential alignment along the entire circumference of the circle which the wheel 241 traverses during operation. Thus, during operation, the tracing unit is caused to traverse a circle while being propelled by the engagement of the driving rotor of the unit 31 with the work. Guiding of the welding unit, however, originates with the forced rotation through 360° of the tracing unit resulting from the grip of the adapter 234 during progress of the tracing unit over a circular path, and by the operation of the electrical control system described hereinbefore which electrically connects the tracing unit to the welding unit.

The welding machines herein described are characterized by self-propelled welding units which may be guided by remote control along devious welding paths. These machines, although highly useful for welding joints, are also adapted for forming layers of juxtaposed fillets on plates of other material, e. g., steel plates such as used in forming lead-lined tanks. Furthermore, a machine having the general features hereinabove described and, when used for lead-burning, substantially reduces the cost thereof by utilizing scrap lead that usually accumulates around an industrial plant engaged in handling corrosive materials, and thus obviates the use of lead in the prefabricated rod or coil form.

While preferred embodiments of the invention have been shown and described, it is to be understood that changes and variations may be made without departing from the spirit and scope of the invention as defined in the appended claims.

I claim:

1. In a pantographic molten metal cladding apparatus having a pantograph, a tracer connected to said pantograph, a pivotal support for the pantograph, and means for adjusting the relative effective lengths of the pantograph links, the improvement which comprises a bracket pivotally connected to the pantograph, driving means for supporting and moving the bracket, a container for molten metal mounted in the bracket for lateral reciprocation therein, a motor mounted on the container, connections operatively associated with the motor and the driving means for turning the driving means, a valve in the bottom of the container, means for periodically opening and closing said valve, said last named means being driven by the motor, a torch mounted on the container and positioned to direct a heating flame adjacent the area onto which the molten metal is deposited from the valve and means for imparting a reciprocating motion to the container in the bracket, said driving means, valve, and container reciprocating means being adapted to be sequentially actuated to deposit the cladding metal along a devious path.

2. Apparatus in accordance with claim 1 having a heater in the container.

3. A molten metal cladding unit comprising a bracket, a container for molten metal reciprocably mounted in said bracket, means mounted on the container for reciprocating the container with respect to the bracket, a valve in the bottom of the container, means mounted on the container for intermittently opening and closing said valve, a burner mounted on the bracket, means mounted on the container for intermittently raising and lowering the burner, a roller on which the bracket and container are supported, and means mounted on the container for turning said roller to move the bracket and container in a predetermined direction, said container reciprocating means, valve, burner, and roller being adapted to be sequentially actuated to deposit the cladding metal along a devious path.

4. Apparatus in accordance with claim 3 in which the means for sequentially actuating the roller, the burner, the valve, and the reciprocation of the container comprises a motor, a shaft driven by said motor, and a plurality of cams operatively associated with said shaft.

5. Apparatus in accordance with claim 4 in which the burner is directed to throw a flame in an area beneath and in advance of the valve.

6. Apparatus in accordance with claim 5 in which the container is provided with heating means for maintaining the metal therein in a molten state.

References Cited in the file of this patent

UNITED STATES PATENTS

| Number | Name | Date |
|---|---|---|
| 535,723 | Olmstead | Mar. 12, 1895 |
| 1,059,271 | Bucknam | Apr. 15, 1913 |
| 1,477,538 | Carter | Dec. 18, 1923 |
| 1,826,164 | Carrier et al. | Oct. 6, 1931 |
| 1,861,758 | Shippy | June 7, 1932 |
| 1,899,775 | Schnable | Feb. 28, 1933 |
| 1,938,819 | Eskilson | Dec. 12, 1933 |
| 2,087,678 | Wagner | July 20, 1937 |
| 2,472,803 | Beyer et al. | June 14, 1949 |
| 2,494,663 | Lobosco | Jan. 17, 1950 |
| 2,524,896 | Downing | Oct. 10, 1950 |